United States Patent Office 3,294,202
Patented Dec. 27, 1966

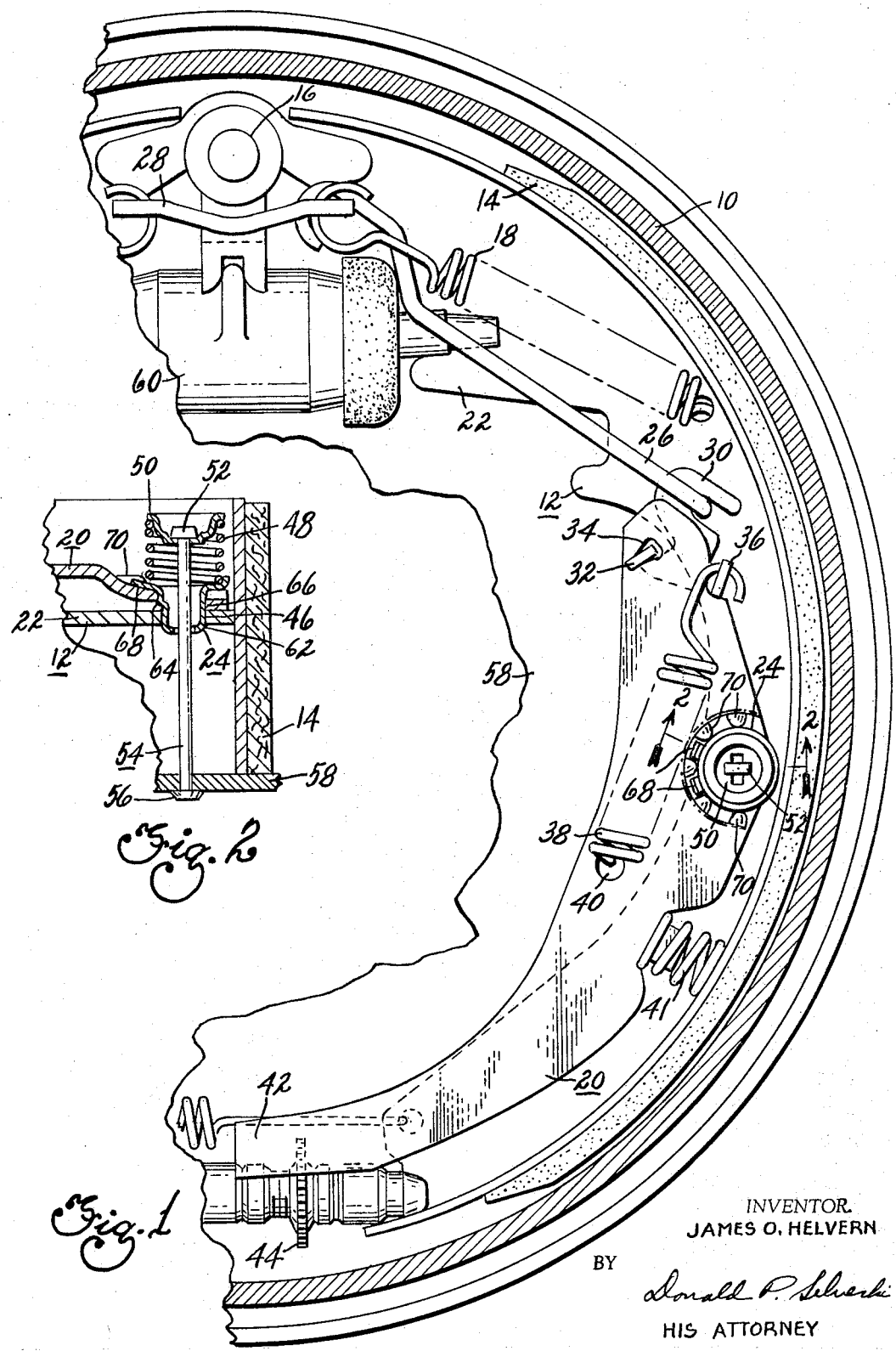

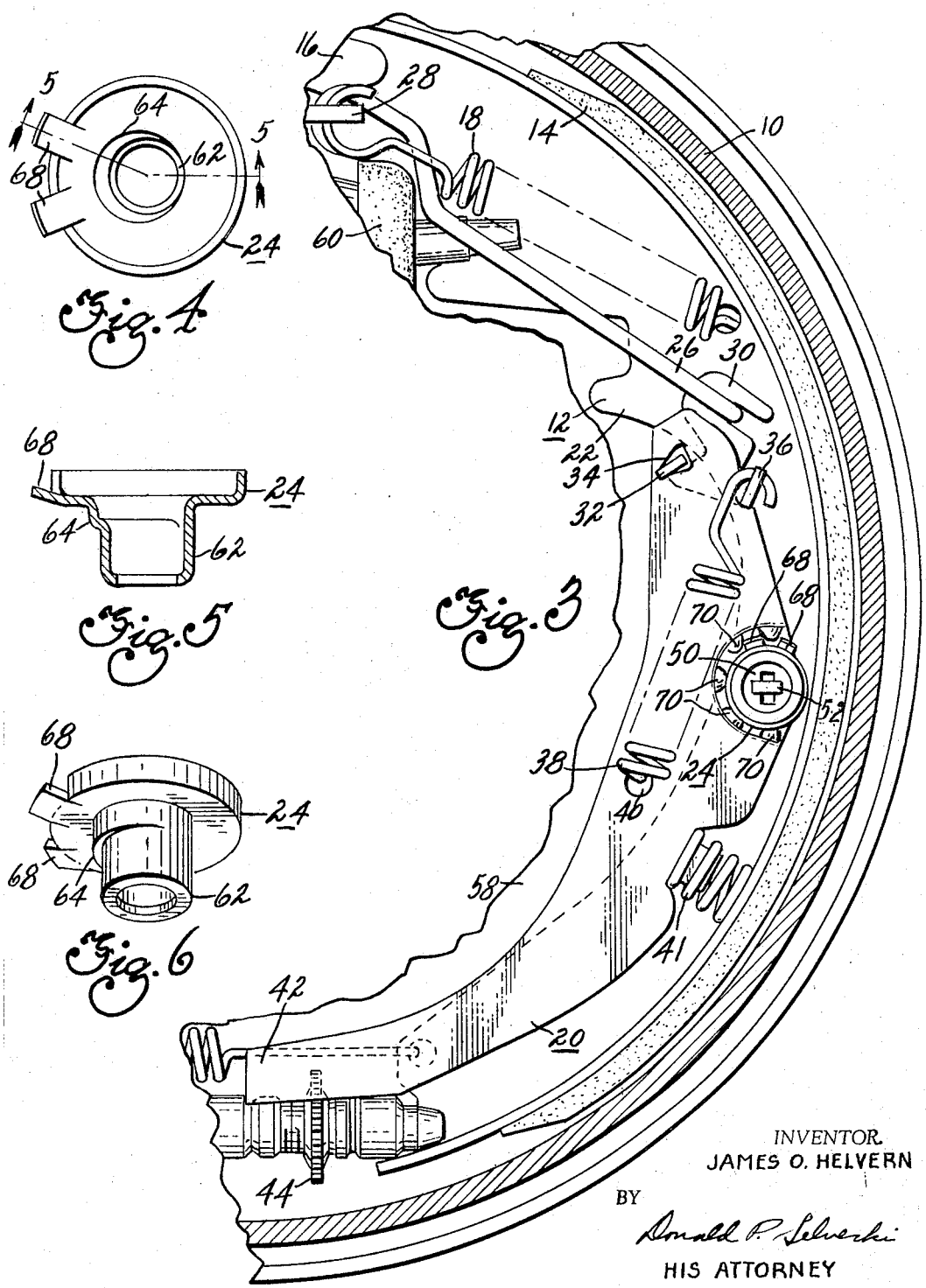

3,294,202
AUTOMATIC BRAKE ADJUSTER
POSITIONING DEVICE
James O. Helvern, Lewisburg, Ohio, assignor to General Motors Corporation, Detroit, Mich., a corporation of Delaware
Filed Oct. 12, 1964, Ser. No. 403,035
4 Claims. (Cl. 188—79.5)

This invention relates to braking mechanisms and more particularly to a positioning device which varies the pivoting position of a brake adjuster lever.

Automatic brakes adjusters of common design include a lever pivotally supported on the web of a brake shoe and include an end adapted to engage a star wheel operating a brake shoe separator. Under normal operating conditions, the brake lining wears and the pivoting distance of the actuating lever becomes greater. When a sufficient pivotal movement is induced in the operating lever, another tooth on the star wheel will be engaged and a brake adjustment takes place on a return motion of the brake shoe after an actuation. Due to the stack-up of dimensional tolerances in the manufacture of such an adjusting mechanism, the amount of pivoting movement of the lever related to the desired clearance of the brake shoe from the brake drum is difficult to maintain. Consequently, it is desirable to be able to change the pivot point of the operating lever in a given installation to guarantee the proper amount of pivoting movement of the operating lever to obtain a brake adjustment when a predetermined amount of brake wear has occurred.

It is an object of the present invention to provide an improved brake adjuster having a variable pivot point.

It is another object of the present invention to provide a brake adjusting lever having a variable pivot point for maintaining a predetermined amount of pivotal movement in the lever when the dimensions of the lever and the supporting mechanism vary.

Further objects and advantages of the present invention will be apparent from the following description, reference being had to the accompanying drawings wherein a preferred embodiment of the present invention is clearly shown.

In the drawings:

FIGURE 1 is a partial elevational view of the subject invention mounted in a typical operative environment;

FIGURE 2 is a sectional view taken along line 2—2 of FIGURE 1;

FIGURE 3 is a partial elevational view of the subject invention shown in its operative environment, with the invention shown in an adjusted position;

FIGURE 4 is an enlarged plan view of the adjusting sleeve of FIGURE 3;

FIGURE 5 is a sectional view taken along line 5—5 of FIGURE 4;

FIGURE 6 is a perspective view of the adjusting sleeve of FIGURE 4.

Referring now to FIGURE 1, a rotatable brake drum 10 is designed to rotate with the wheels of a vehicle. A brake shoe 12 carrying a lining 14 is held in biased engagement with an anchor pin 16 by a spring 18 and is disposed a predetermined distance away from the drum 10. This distance between the lining 14 and the drum 10 is the normal operating clearance of the vehicle brake and is maintained as the lining 14 wears through an adjusting mechanism to be hereinafter described.

The adjusting mechanism is comprised of a lever 20 pivotally supported on a web 22 of the brake shoe 12 by an adjusting sleeve 24. A fixed link 26 has one end engaging a shoe retaining member 28 mounted on the anchor pin 16 and another end engaging a floating lever 30. The floating lever 30 has an upstanding flange 32 cooperating with an aperture 34 in the lever 20 and another upturned flange 36 engaged by a lever return spring 38. The spring 38 is held at its opposite end by an aperture 40 in the lever 20. A return or assist spring 41 is disposed between the lever 20 and the brake shoe 12.

The lever 20 has an end 42 adapted to cooperate with a star wheel 44 to rotate the star wheel and thereby drive opposing ends of the brake shoe 12 and another brake shoe, not shown, in closer proximity to the drum 12. A brake adjusting mechanism of the type described herein is designed to be pivotable a predetermined amount when brake lining wear has progressed to a point where the clearance between the lining 14 and the drum 10 is excessive. Therefore, it is clear that the amount of pivoting movement of the lever 20 which will allow a tooth of the star wheel 44 to be engaged in an adjusting motion is directly related to the amount of clearance desired between the lining 14 and the drum 10.

The mechanism hereinbefore described is of the conventional type and is not meant to be included as a portion of the present invention. A problem normally associated with the type of adjuster previously described is that of stack-up of dimensional tolerances between the lever 20 and the brake shoe 12. It is also possible that the fixed link 26, the floating lever 30 and the lever 20 vary in dimension. For these reasons, the amount of pivotal movement induced in the lever 20 relative to the star wheel 44 can vary when the dimensional tolerances of the parts described accumulate.

Referring to FIGURE 2, the mounting of the lever 20 on the sleeve 24 is more clearly shown. The sleeve 24 is pivotally mounted in an aperture 46 in the web 22 of the brake shoe 12. A spring 48 holds the sleeve 24 in the aperture 46 by being compressed between a spring retainer 50 and a flared end 52 of a pin 54. As illustrated in FIGURE 2, the pin 54 has a retaining end 56 engaging the far side of a backing plate 58 on the opposite side from which the shoe 12 is disposed. It should be noted that the backing plate 58 is carried in fixed relationship with respect to the vehicle on which the brake is mounted and also carries the anchor pin 16 and an hydraulic wheel cylinder 60.

Referring to FIGURE 4, a plan view of the adjusting sleeve 24 is illustrated. Sleeve 24 includes a cup-shaped end 62 having the same outside diameter as the aperture 46 in the web 22. Another portion of the sleeve 24 has a cam surface 64 circumferentially disposed thereon. It is seen that the cam surface 64 is eccentric with respect to the portion 62. This eccentric portion or cam surface 64 is also clearly seen in FIGURES 5 and 6. The portion 64 cooperates with an aperture 66 in the lever 20 which is of a greater diameter than the outside diameter of the cam surface 64. Outwardly projecting lugs 68 are bent out tangs from the sleeve 24. The tangs 68 are substantially the same dimension laterally as the spacing between a series of raised portions 70 formed on a surface of the lever 20. It is therefore seen that very little relative movement is possible between the tangs 68 when positioned between any of the raised portions 70.

The raised portions 70 are more clearly illustrated in FIGURES 1 and 2. The pivot point of the lever 20 is determined by the portion of the surface 64 contacting the edge of the aperture 66. Thus, it is seen that the lever 20 can be moved away from the brake lining 14 by turning the adjusting sleeve 24 so that the higher portions of the cam surface 64 contact the lever 20. As previously stated, the cup-shaped portion 62 is the pivot point of the sleeve 24 but the movement of the lever 20 away from the center of the portion 62 causes a change in the pivot point and, consequently, adjusts the distance in which the lever 20 can pivot.

The tangs 68 cooperate with the raised portions 70 to maintain the eccentric mounting of the lever relative to the sleeve 24 after an adjustment has been made. Thereafter, the sleeve 24 will continue to pivot in the aperture 46 but the lever 20 will have been moved relative to the cup-shaped portion 62 and this will result in the end 42 of the lever 20 moving a greater or lesser distance relative to the star wheel 44.

In operation, it will be assumed that drum 10 is rotating in a clockwise manner around the periphery of the shoe 12, as viewed in FIGURE 1. If a pressure build-up occurs in a wheel cylinder 60, the brake shoe 12 carrying the lining 14 will move toward the rotating drum 10. The link 26 being fixed with respect to the brake shoes and the rotating drum will draw the floating lever 30 counterclockwise relative to the aperture 66. This will result in the lever 20 being pivoted against the tension of the spring 41 around the star wheel 44. If the end 42 had previously engaged a tooth on the star wheel 44, an adjusting movement in the shoe spreading mechanism will take place and a brake adjustment results. It is understood that the brake shoe 12 will move toward the rotating drum 10 until frictional contact therebetween is made and thereafter will be drawn in the direction of rotation due to the normal servo action present in brakes of this type. This movement will add to the pivoting motion of the floating liner 30 and, consequently, the pivoting movement of the lever 20 will likewise increase.

As the brake is released and pressure decreases in the cylinder 60, the return spring 18 will become dominant and reseat the brake shoe 12 against the anchor pin 16. The pivoting pressure against the floating lever 30 will decrease and will be effectively reversed by the force of the spring 38. As the brake shoe 12 is reseated on the anchor pin 16, the lever 20 will pivot in a clockwise manner about the aperture 66 and the end 42 will be raised to a poised position against the star wheel 44. If this movement toward the poised position is sufficient to engage another tooth of the star wheel 44, the lever 20 will readjust the clearance between the lining 14 and the drum 10 on the next application of the brakes.

It is obvious then that design considerations demand that a relationship exists between the amount of movement of the lever 30 and the clearance between the linings 14 and the drum 10. When the clearance is exceeded due to the lining 14 becoming worn, the return motion of the lever 20 to a poised position will increase and a new tooth on the star wheel 44 will be more readily engageable. The predetermined clearance between the linings 14 and the drum 10 can therefore be related to the distance between the teeth of the star wheel 44 and the pivoting movement of the end 42 of the lever 20. When this predetermined amount of movement related to the desired clearance is established, a single check of the end 42 of the lever 20 and the teeth of the star wheel 44 can be made at the original installation and the determination of the dimensions of the adjusting mechanism made.

If it is determined that the pivoting movement during a brake actuation of the lever 20 is too great to allow a return to a poised position engaging the next tooth on the star wheel 44, the pivot point of the lever 20 relative to the aperture 66 can be made by rotating the sleeve 24 while maintaining the lever 20 stationary. This is presuming that the cam surface 64 is contacting the lever 20 at its lowest point. It is obvious that, as the cam surface 64 is rotated in a camming manner against the lever 20, the lever 20 will move leftwardly, as is viewed in FIGURE 1, and will be moved further away from the lining 14. As the sleeve 24 is rotated relative to the stationary lever 20, the tangs 68 will be positioned between a different series of raised portions 70 on the lever 20 and this newly established location of the lever 20 will be thereafter maintained.

If it is found on checking the static dimension between the end 42 of the lever 20 and the star wheel 44 that too much pivoting movement occurs when the brake is applied, the lever 20 can be positioned nearer the lining 14 by rotating the sleeve 24 in a counterclockwise fashion or to a lower position on the cam surface 64. Therefore, a ready adjustment of the pivoting movement of the lever 20 is possible within a range equal to the height of the cam surface 64 above the outer diameter of the portion 62 of the sleeve 24.

The utility of the present invention can be extended into any environment where it is desirable to vary the effective pivot point of a lever. The addition of the holding means, that is, the cooperation between the tangs 68 and the raised portions 70, serves to maintain the pivot point as newly established and adds to the utility of the invention. It is understood that other means could be employed for holding the newly established pivot point in a fixed position without departing from the essence of the present invention. In the chosen environment of a brake system, it is important to have few moving parts and parts that are operationally stable under the adverse heat conditions normally associated with a braking system. Economy of manufacture also militates for the use of the holding means being integral to the pivoting means as described herein.

While the embodiment of the present invention, as herein disclosed, constitutes a preferred form, it is to be understood that other forms might be adopted.

What is claimed is as follows:

1. A positioning device for a lever actuated brake shoe adjuster, said positioning device comprising: brake shoes in juxtaposition to a rotatable brake drum and having a preset clearance therefrom; expandable means interposed between opposite ends of the brake shoes and arranged to be movable to maintain the preset clearance between the brake shoes and brake drum; lever means pivotally supported on a brake shoe and including an end arranged to cooperate with the expandable means during brake actuation and retraction to maintain a preset clearance between the brake shoes and the brake drum as wear progresses; first means for varying the pivoting position of the lever thereby varying the amount of pivotal movement thereof; and second means carried by the lever and arranged to cooperate with said first means to maintain the lever in a selected position wherein said lever pivoting capability is adjusted relative to the expandable means to maintain the spaced relationship of the brake shoes and the brake drum.

2. A positioning device according to claim 1 wherein the first means is a sleeve pivotable on a brake shoe and including cam portions for eccentrically moving the pivoting position of the lever, and outwardly extending lugs arranged to cooperate with the second means to hold the lever in a selected pivoting position.

3. A positioning device according to claim 1 wherein the second means is a series of spaced raised portions integrally formed on the lever and arranged to cooperate with the first means in gear-type engagement to maintain the lever in a selected pivoting position.

4. A positioning device for a lever actuated brake adjuster, said positioning device comprising: a sleeve biasedly mounted on a brake shoe and having cam portions and locking portions; a brake adjusting lever pivotally mounted on the sleeve and arranged to be repositioned by the cam portions of the sleeve; and holding means carried by the pivotable lever in an arcuate manner relative to the sleeve and arranged to cooperate with the locking portions of the sleeve to maintain the adjusting lever in a selected pivoting position wherein the amount of pivotal movement allowed the lever relative to brake adjusting mechanism is limited.

References Cited by the Examiner
UNITED STATES PATENTS

| | | |
|---|---|---|
| 56,631 | 7/1866 | Stiles. |
| 3,075,403 | 1/1963 | Hepner _____ 74—522 X |

DUANE A. REGER, *Primary Examiner.*